No. 620,716. Patented Mar. 7, 1899.
J. C. MONTGOMERIE.
FILTER PRESS AND CLOTH THEREFOR.
(Application filed Mar. 14, 1898.)
(No Model.) 3 Sheets—Sheet 1.

Witnesses. Inventor.

No. 620,716. Patented Mar. 7, 1899.
J. C. MONTGOMERIE.
FILTER PRESS AND CLOTH THEREFOR.
(Application filed Mar. 14, 1898.)
(No Model.) 3 Sheets—Sheet 2.

Witnesses.
Alex. F. Reid
John Brown

Inventor.
John C. Montgomerie

No. 620,716. Patented Mar. 7, 1899.
J. C. MONTGOMERIE.
FILTER PRESS AND CLOTH THEREFOR.
(Application filed Mar. 14, 1898.)
(No Model.) 3 Sheets—Sheet 3.
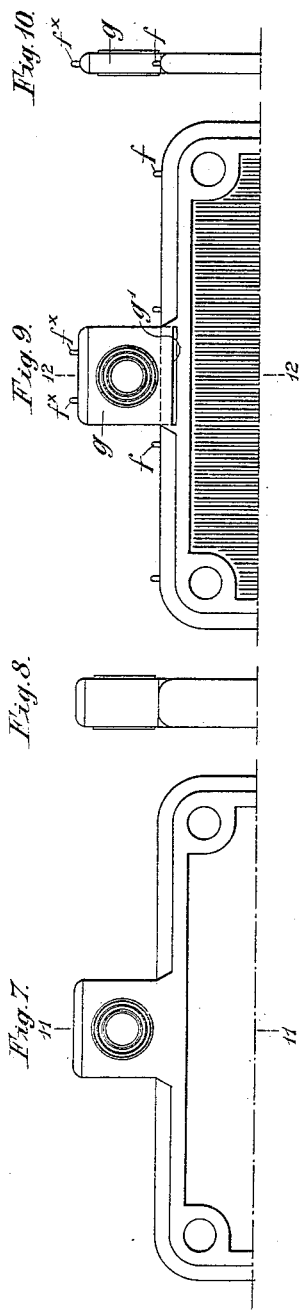
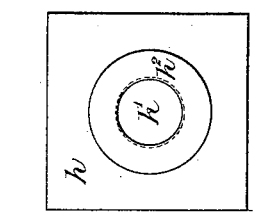
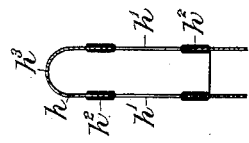
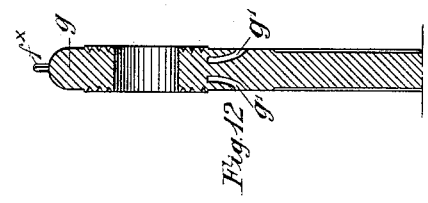
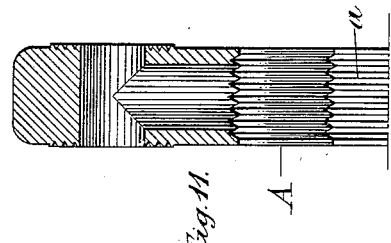
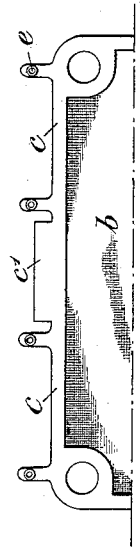
Witnesses. Inventor:
Alex F Reid John C Montgomerie
John Brown

UNITED STATES PATENT OFFICE.

JOHN CUNINGHAME MONTGOMERIE, OF DALMORE, STAIR, SCOTLAND.

FILTER-PRESS AND CLOTH THEREFOR.

SPECIFICATION forming part of Letters Patent No. 620,716, dated March 7, 1899.

Application filed March 14, 1898. Serial No. 673,771. (No model.)

*To all whom it may concern:*

Be it known that I, JOHN CUNINGHAME MONTGOMERIE, a subject of Her Majesty the Queen of Great Britain and Ireland, residing at Dalmore, Stair, in the county of Ayr, Scotland, have invented certain new and useful Improvements in Filter-Presses and Cloths Therefor, (in respect whereof I have applied for Letters Patent in Great Britain to bear date January 1, 1898, No. 81,) of which the following is a specification.

This invention relates to filter-presses; and it consists in various improvements in the details of their construction, whereby their manipulation is facilitated and their efficiency increased.

Figures 3, 4:
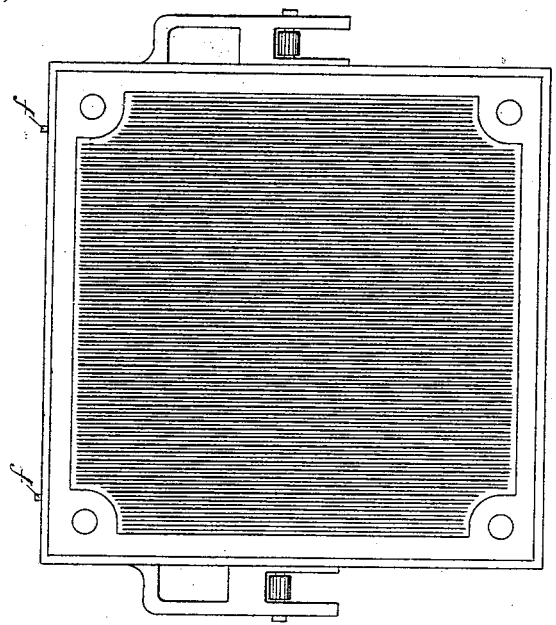
Figure 2:
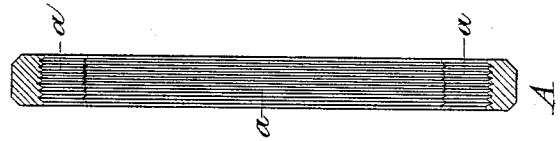
Figure 1:
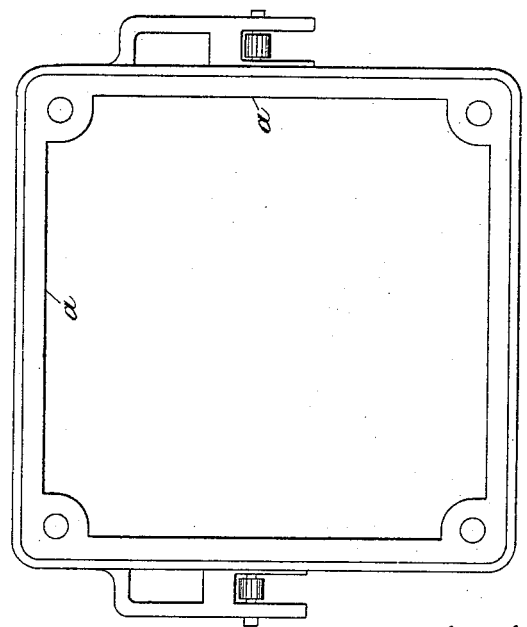
Figure 5:
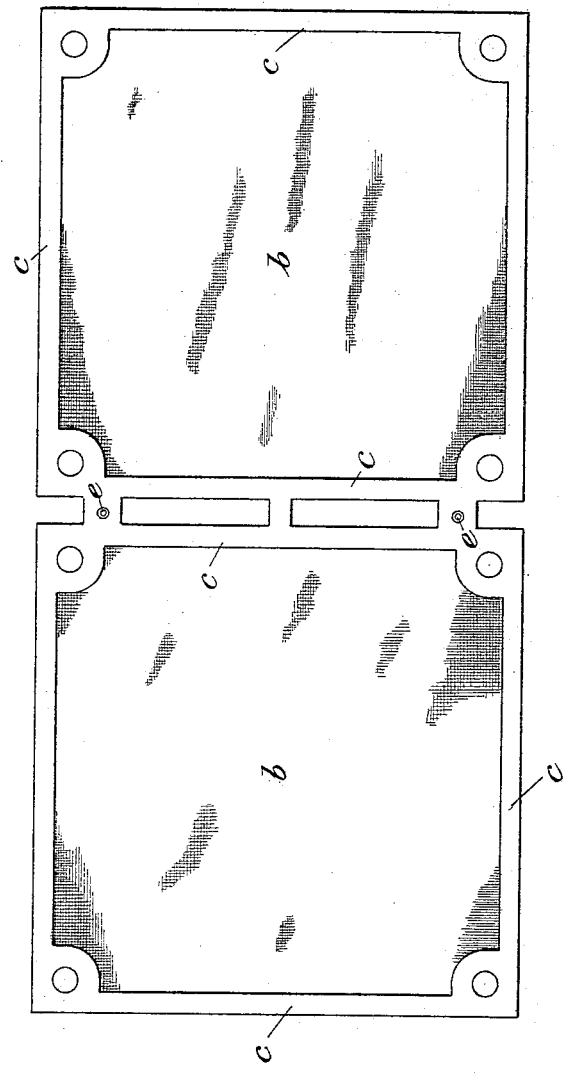
Figure 6:
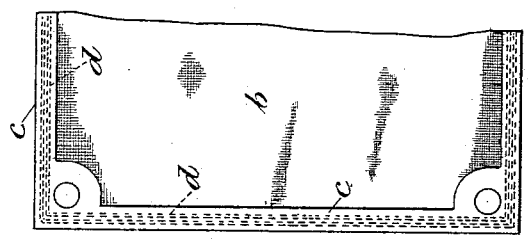

In the accompanying drawings, Figures 1 and 2 are respectively a face view and a transverse section of a filter-frame constructed according to my invention. Figs. 3 and 4 are respectively a face view and a transverse section of the filter-plate. Figs. 5 and 6 are views of filter-cloths prepared according to my improved method. Figs. 7 and 8 are views of the face and end, respectively, of the upper portion of a filter-frame, showing the feeding-channel. Figs. 9 and 10 are similar views of a filter-plate, showing the lug of the feeding-channel formed with a recess for the reception of a flap on the filter-cloth. Fig. 11 is an enlarged transverse section on the line 11 11 in Fig. 7. Fig. 12 is an enlarged transverse section on the line 12 12 in Fig. 9. Fig. 13 is a face view, and Fig. 14 a transverse section, of the cloth hood applied to the lug of the feeding-channel of the filter-plate. Fig. 15 is a view of the upper portion of a filter-cloth furnished with a flap for insertion in a recess or pocket formed in the filter-plate.

When washing materials—as, for instance, gold and silver ores—in a filter-press, I have observed a tendency for the wash-water to pass between the inner and smooth surfaces of the frames and the material under treatment, the quantity of wash-water required to effect the operation being in consequence largely augmented. In order to prevent leakage of this character, I form the inner surfaces of the frames A with grooves or corrugations $a$, the same being arranged parallel with the faces of the frame and transverse to the general direction of flow of the liquid, whereby the wash-water is caused to pass through the mass of the material instead of around its sides. When air is passed through the filter-press to dry the material before the latter is discharged, the grooved or corrugated surfaces $a$ of the frames have the same effect and cause the air to permeate more thoroughly the mass of material. It is not necessary to cleanse the grooves between each charge, because, assuming the same kind of material to remain under treatment, the fresh charge makes a good joint with any material that may be left in the grooves from the previous charge.

In order to secure good joints and prevent leakage, the cleansing of the faces of the filter-plates, distance-frames, and filter-cloths is a matter of importance. For the expeditious and effective accomplishment of this object I employ what may be termed an "air-brush" or "nozzle," whence a jet of high-pressure air issues and impinges against the various surfaces to be cleansed.

In working filter-presses I have also found that considerable leakage takes place through the cloth-joints owing to capillary attraction, such leakage being increased by the pressure used in charging the press and washing the material therein. To prevent this waste, I coat the edges and sides of the cloths $b$ with vulcanized rubber $c$ or similar composition, so that a solid piece of rubber may lie outside the edges of the cloth and extend inward so far as the catch on the face of the plates, where the plates grip when pressure is applied to close the press for work.

In order to prevent the stretching of the edges of the filter-cloth, I introduce brass or other suitable wire $d$ into the said edges during the process of weaving the cloth, and I afterward coat these portions with the vulcanized rubber. I also prefer to cement the edges of the cloths, whether vulcanized or not, to the edges of the plates, thus preventing their becoming displaced and time being lost in their adjustment. The filter-cloth may be provided with perforations $e\ e$, which on the cloth being folded over the filter-plate engage with pins $f\ f$ on the edge of the latter.

By the foregoing method of treating filter-cloths a practically tight joint is obtained and all waste of the liquid treated or of the wash-water is avoided.

In working a filter-press provided with a feeding-channel arranged along the top of the filter-plates great difficulty is experienced on opening the plates in preventing the material falling between the filter-plates and the filter-cloth. To obviate this inconvenience, I form on the lug $g$ of the feeding-channel a recess or pocket $g'$, in which a flap $c'$ on the upper edge of the filter-cloth $b$ is inserted. Various devices have also been resorted to with the object of making a tight joint between the channels of the plates and of the frames, but all have proved more or less faulty and troublesome. According to my improved method of construction I fit over the channel-lug $g$ of the plate a cloth hood $h$, provided with holes $h'$ to match the channel-holes, and I saturate the cloth surrounding the holes with india-rubber $h^2$ to the extent of the grip of the lug on the cloth, the holes in the cloth hood being preferably made one-eighth inch larger than the channel-hole, so that the rubber may cover the edge of the cloth, and thus prevent the liquid being forced out through the pores of the cloth. The rubber is vulcanized after it is applied to the cloth. The hood $h$ is perforated at $h^3\ h^3$ to engage with pins $f^\times\ f^\times$ on the lug $g$ of the filter-plate.

In practice I prefer to interpose between the corrugated face of the filter-plate and the cloth a three-sixteenth-inch-mesh sieve instead of the usual perforated plate. I have not, however, considered it necessary to illustrate this sieve, as its application will be readily understood by those familiar with the construction and working of filter-presses.

To prevent the clogging of the cloths with mud or other matter, I wash the material in the press, the first charge from one side and the next charge in the opposite direction, and so on alternately. In this way the filter-cloths are always kept fairly clean, and the necessity for frequently removing the cloths for washing is avoided, great saving in time and labor resulting.

What I claim as my invention, and desire to secure by Letters Patent, is—

1. For employment in a filter-press, a filter-frame constructed substantially as herein described and having its inner surfaces formed with grooves or corrugations parallel with the faces of the frame and transverse to the general direction of flow of the liquid, whereby the wash-water or other medium is caused to traverse the mass of material under treatment, instead of flowing across the surface of the frame.

2. For employment in a filter-press, a folding filter-cloth having perforations for engaging with pins on the edge of the filter-plate and having its edges coated with vulcanized rubber or similar water-tight composition, substantially as set forth.

3. For employment in a filter-press, a filter-cloth having brass or other suitable wire woven into its edges, these parts being then coated with vulcanized rubber or similar composition, substantially as and for the purposes set forth.

4. In a filter-press provided with a feed-channel on the top of the filter-plates, the herein-described means for preventing the ingress of the material between the filter-plate and the cloth, same consisting in a recess or pocket in said filter-plate into which a flap on said filter-cloth is inserted.

5. For employment in a filter-press provided with a feed-channel on the top of the filter-plates, a filter-plate having a recess or pocket, such as $g'$, formed at or about the junction of the lug of the feed-channel with the plate, substantially as and for the purpose specified.

6. For employment in a filter-press provided with a feed-channel on the top of the filter-plates, a filter-cloth having a flap, such as $c'$, extending from the upper edge of the cloth, substantially as and for the purpose specified.

7. In a filter-press provided with a feed-channel on the top of the filter-plates, the herein-described means for effecting a tight joint between the feed-channels pertaining to the plates and frames, same consisting in combining with a channel-lug a cloth hood having holes corresponding with the holes in the lugs; the cloth surrounding the edges of the holes in the hood being saturated with india-rubber.

8. For employment in a filter-press provided with a feed-channel on the top of the filter-plates, a cloth hood $h$ having holes $h'$ slightly larger in area than the feed-channel and surrounded by india-rubber to the extent of the grip of the lug on the cloth, substantially as and for the purpose specified.

JOHN CUNINGHAME MONTGOMERIE.

Witnesses:
ALEXR. F. REID,
JOHN BROWN.